US012362110B2

(12) United States Patent
Chang et al.

(10) Patent No.: US 12,362,110 B2
(45) Date of Patent: Jul. 15, 2025

(54) KEYCAP

(71) Applicant: Primax Electronics Ltd., Taipei (TW)

(72) Inventors: Sheng-Fan Chang, Taipei (TW); Che-An Li, Taipei (TW); Chang-Huan Shen, Taipei (TW); Chuang-Shu Jhuang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 221 days.

(21) Appl. No.: 18/123,869

(22) Filed: Mar. 20, 2023

(65) Prior Publication Data

US 2024/0266126 A1 Aug. 8, 2024

(30) Foreign Application Priority Data

Feb. 2, 2023 (CN) ........................ 202310089926.1

(51) Int. Cl.
*H01H 13/14* (2006.01)
*H01H 11/00* (2006.01)
*H01H 13/20* (2006.01)

(52) U.S. Cl.
CPC ............ *H01H 13/14* (2013.01); *H01H 11/00* (2013.01); *H01H 13/20* (2013.01)

(58) Field of Classification Search
CPC ........ H01H 13/14; H01H 11/00; H01H 13/20; H01H 13/07; H01H 2229/042; H01H 2233/014; H01H 2233/07; H01H 2233/072; H01H 2233/074
See application file for complete search history.

(56) References Cited

U.S. PATENT DOCUMENTS

| | | | | |
|---|---|---|---|---|
| 10,699,853 | B2 * | 6/2020 | Huang | H01H 13/88 |
| 12,211,657 | B2 * | 1/2025 | Tsai | H01H 3/125 |
| 2018/0337005 | A1 * | 11/2018 | Jhuang | H01H 13/705 |

FOREIGN PATENT DOCUMENTS

CN 215496488 U * 1/2022

* cited by examiner

*Primary Examiner* — Renee S Luebke
*Assistant Examiner* — Robert M Schmitz
(74) *Attorney, Agent, or Firm* — KIRTON McCONKIE; Evan R. Witt

(57) ABSTRACT

The present invention provides a keycap, which includes a lower plate and an upper cover. The lower plate has at least two engaging holes recessed inwardly from an upper surface of the lower plate and separated from each other. The upper cover is configured to be detachably assembled on the lower plate, in which the upper cover has at least two buckle members disposed on an inner top surface of the upper cover and respectively corresponding to the at least two engaging holes, and each of the buckle members has two buckle portions separated from each other, and each of the buckle portions has a protrusion protruding laterally outward, and each of the protrusions is configured to engage with a portion of the corresponding engaging hole.

9 Claims, 5 Drawing Sheets

KEYCAP

FIELD OF THE INVENTION

The present disclosure relates to a keycap, in particular to a keycap including a lower plate and an upper cover configured to be detachably assembled on the lower plate.

BACKGROUND OF THE INVENTION

Keycaps of key structures of an existing keyboard device cannot be replaced. If the user wants to replace the keycaps with other keycaps (e.g., keycaps with different appearances), the entire keyboard device must be replaced, which is very inconvenient.

SUMMARY OF THE INVENTION

The present disclosure provides a keycap, which includes a lower plate and an upper cover. The lower plate has at least two engaging holes recessed inwardly from an upper surface of the lower plate and separated from each other. The upper cover is configured to be detachably assembled on the lower plate, in which the upper cover has at least two buckle members disposed on an inner top surface of the upper cover and respectively corresponding to the at least two engaging holes, and each of the buckle members has two buckle portions separated from each other, and each of the buckle portions has a protrusion protruding laterally outward, and each of the protrusions is configured to engage with a portion of the corresponding engaging hole.

In some embodiments of the present disclosure, a top-view shape of the engaging hole is circular, and an outer edge of each of the buckle portions is arc-shaped.

In some embodiments of the present disclosure, an outer edge of the protrusion is arc-shaped.

In some embodiments of the present disclosure, a length of the arc shape of the outer edge of the buckle portion is greater than a length of the arc shape of the outer edge of the protrusion.

In some embodiments of the present disclosure, the protrusion has an abutting wall away from a lower surface of the buckle portion, and each of the engaging holes has a lower sloping surface configured to face the abutting wall after the upper cover is assembled on the lower plate.

In some embodiments of the present disclosure, the abutting wall and the lower sloping surface are complementary to each other.

In some embodiments of the present disclosure, each of the engaging holes further has an upper sloping surface located over the lower sloping surface and configured to guide the protrusion into the engaging hole.

In some embodiments of the present disclosure, an overlapping distance between the protrusion and an edge of the corresponding engaging hole is in a range of from about 0.05 mm to about 0.15 mm.

In some embodiments of the present disclosure, the upper cover has a side opening.

In some embodiments of the present disclosure, the lower plate has four connecting portions disposed on a lower surface of the lower plate, and the four connecting portions are configured to respectively connect four portions of a scissor-type connecting element.

The present disclosure further provides a tool for disassembling the upper cover of the above-mentioned keycap, which includes a handheld portion and two engaging portions. The two engaging portions are respectively connected to two opposite sides of a bottom surface of the handheld portion and configured to respectively engage two opposite sides of the upper cover.

BRIEF DESCRIPTION OF THE DRAWINGS

Aspects of the present disclosure are best understood from the following embodiments, read in conjunction with the accompanying drawings. It should be understood, however, that in accordance with common practice in the industry, various features have not necessarily been drawn to scale. Indeed, shapes of the various features may be suitably adjusted for clarity, and dimensions of the various features may be arbitrarily increased or decreased.

DETAIL DESCRIPTION OF THE PREFERRED EMBODIMENT

Figure 1:
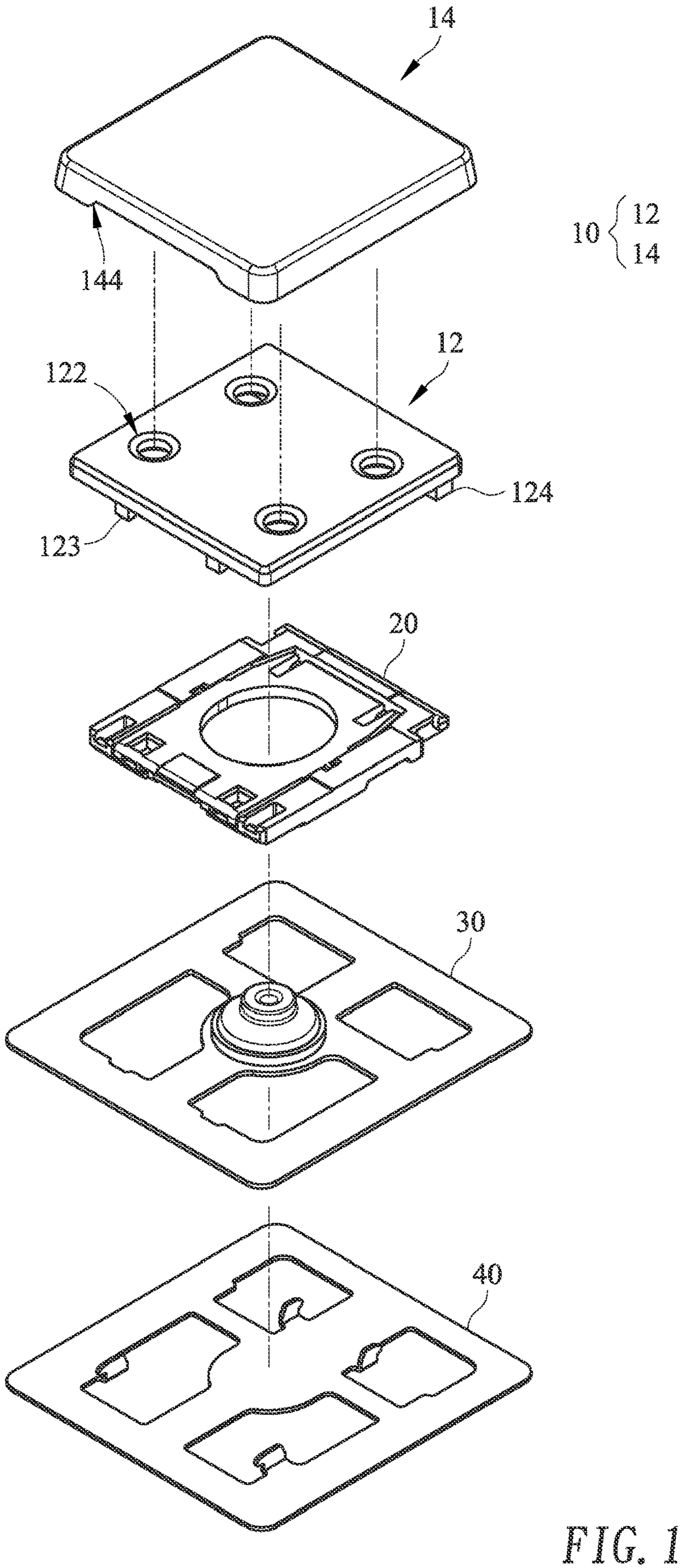
FIG. 1 is a top perspective exploded schematic diagram of a key structure according to an embodiment of the present invention.

The advantages and features of the present disclosure and the method for achieving the same will be described in more detail with reference to exemplary embodiments and the accompanying drawings to make it easier to understand. However, the present disclosure can be implemented in different forms and should not be construed as being limited to the embodiments set forth herein. On the contrary, for those skilled in the art, the provided embodiments will make this disclosure more thorough, comprehensive and complete to convey the scope of the present disclosure.

The spatially relative terms in the text, such as "beneath" and "over", are used to facilitate the description of the relative relationship between one element or feature and another element or feature in the drawings. The true meaning of the spatially relative terms includes other orientations. For example, when the drawing is flipped up and down by 180 degrees, the relationship between the one element and the other element may change from "beneath" to "over." In addition, the spatially relative descriptions used herein should be interpreted the same.

As described in the related art, the keycaps of the key structures of the existing keyboard device cannot be replaced. If the user wants to replace the keycaps with other keycaps (e.g., keycaps with different appearances), the entire keyboard device must be replaced, which is very inconvenient. Accordingly, the present invention provides a keycap, which includes a lower plate and an upper cover, and the user can easily disassemble the upper cover from the lower plate and assemble the upper cover or another upper cover on the lower plate, that is, the user can replace the upper cover of the keycap at will, which is very convenient. Various embodiments of the keycap of the present invention will be described in detail below.

FIG. 1 is a top perspective exploded schematic diagram of a key structure according to an embodiment of the present invention. In some embodiments, as shown in FIG. 1, the key structure includes a keycap 10, a scissor-type connecting element 20, a membrane circuit board 30 and a base plate 40, and the membrane circuit board 30 and the base plate 40 are located beneath the scissor-type connecting element 20, and the scissor-type connecting element 20 is located beneath the keycap 10. In some embodiments, the key structure further includes an elastic element (not marked) interposed between the keycap 10 and the membrane circuit board 30.

Figure 2:
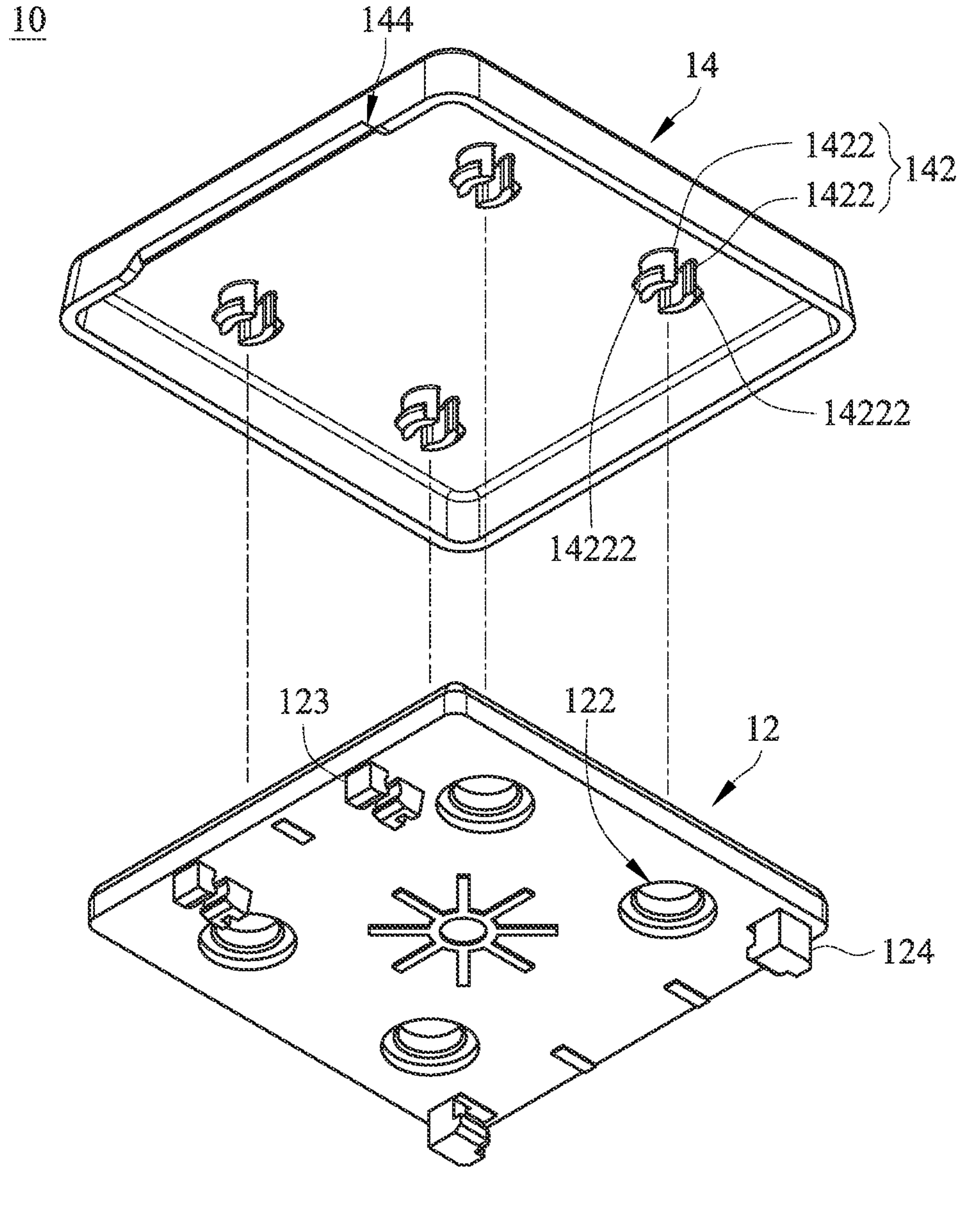
FIG. 2 is a bottom perspective exploded schematic diagram of a keycap of FIG. 1.

FIG. 2 is a bottom perspective exploded schematic diagram of a keycap of FIG. 1. Referring to FIGS. 1 and 2, the keycap 10 includes a lower plate 12 and an upper cover 14. The lower plate 12 has at least two engaging holes 122 recessed inwardly from an upper surface of the lower plate 12 and separated from each other. In some embodiments, the at least two engaging holes 122 are through the lower plate 12. In some embodiments, the lower plate 12 may have more than two engaging holes 122, such as four engaging holes 122 (as shown in FIGS. 1 and 2). In some embodiments, a top-view shape of the engaging hole 122 is circle or another suitable shape.

In some embodiments, as shown in FIGS. 1 and 2, the lower plate 12 has four connecting portions (e.g., two hook portions 123 and two slide grooves 124) disposed on a lower surface of the lower plate 12, which are configured to respectively connect four portions of the scissor-type connecting element 20 shown in FIG. 1. In some embodiments, as shown in FIG. 1, the base plate 40 has four hook parts (not marked), which are configured to respectively connect to other four portions of the scissor-type connecting element 20. As such, it can be ensured that the scissor-type connecting element 20 does not detach from the lower plate 12 of the keycap 10 and the base plate 40 when the key structure is in operation. However, the present invention is not limited to the above-mentioned embodiments, and the lower plate 12 may have connecting portions with other structures disposed on the lower surface of the lower plate 12 to cooperate with another component located beneath the lower plate 12.

Figure 3:
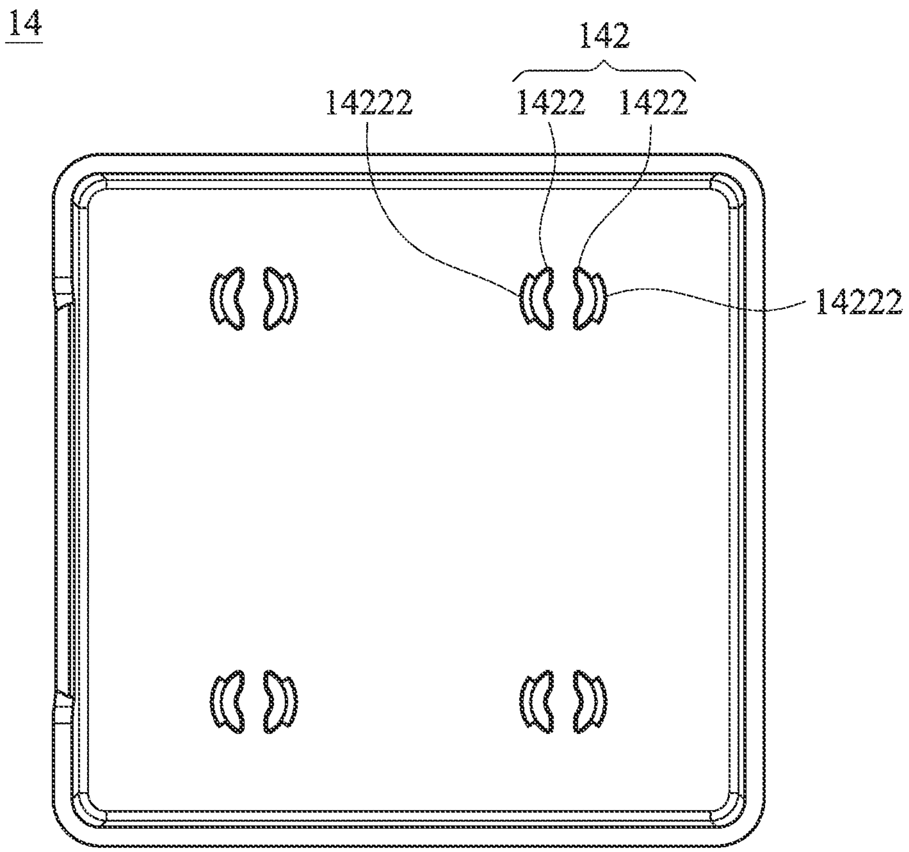
FIG. 3 is a bottom view of an upper cover of FIG. 2.

FIG. 3 is a bottom view of an upper cover of FIG. 2. As shown in FIGS. 1 to 3, the upper cover 14 is configured to be detachably assembled on the lower plate 12. As shown in FIGS. 2 and 3, the upper cover 14 has at least two buckle members 142 disposed on an inner top surface of the upper cover 14 and respectively corresponding to the at least two engaging holes 122. In some embodiments, the upper cover 14 may have two or more buckle members 142, such as four buckle members 142 (as shown in FIGS. 2 and 3). In some embodiments, as shown in FIGS. 1 and 2, the upper cover 14 has a side opening 144 to facilitate the user to disassemble the upper cover 14 by hand.

As shown in FIGS. 2 and 3, each of the buckle members 142 has two buckle portions 1422 separated from each other. In some embodiments, an outer edge of each of the buckle portions 1422 is arc-shaped. Each of the buckle portions 1422 has a protrusion 14222 protruding laterally outward. Each of the protrusions 14222 is configured to engage with a portion of the corresponding engaging hole 122. In some embodiments, an outer edge of the protrusion 14222 is also arc-shaped. In some embodiments, as shown in FIG. 3, a length of the arc shape of the outer edge of the buckle portion 1422 is greater than a length of the arc shape of the outer edge of the protrusion 14222.

Figure 4:
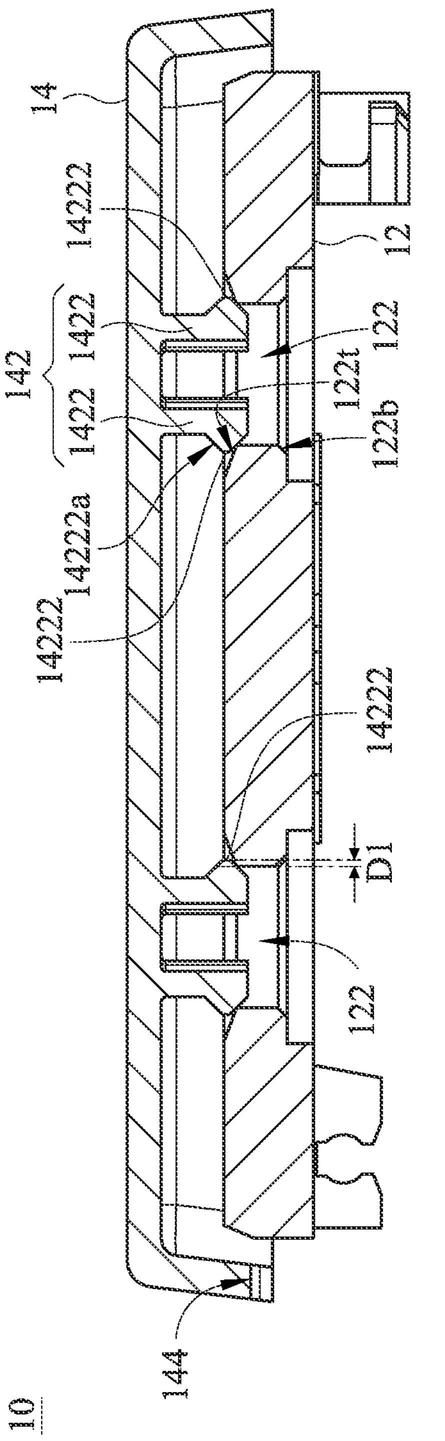
FIG. 4 is a cross-sectional view when the upper cover is placed on a lower plate in FIG. 2.
Figure 5:
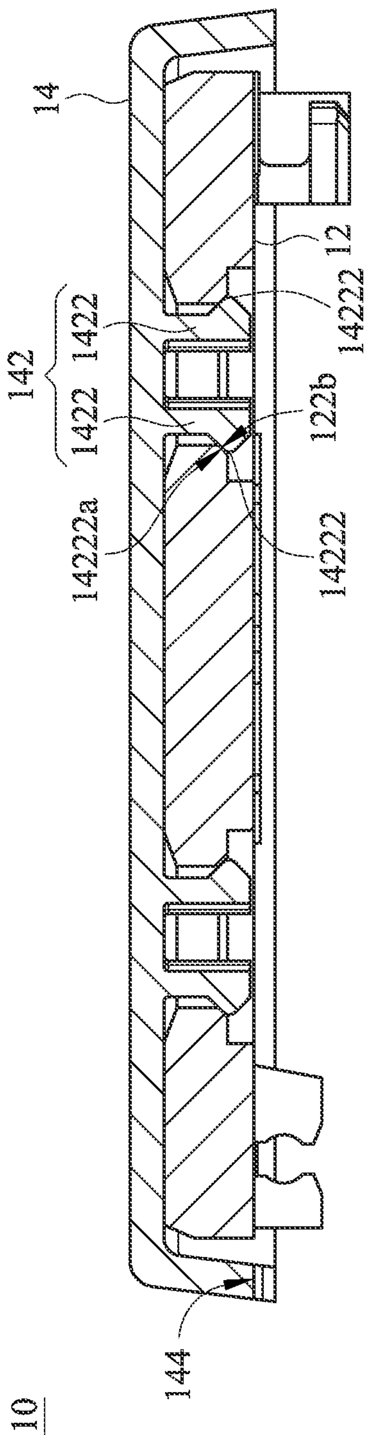
FIG. 5 is a cross-sectional view after the upper cover is assembled on the lower plate in FIG. 4.

FIG. 4 is a cross-sectional view when the upper cover is placed on a lower plate in FIG. 2. FIG. 5 is a cross-sectional view after the upper cover is assembled on the lower plate in FIG. 4. In some embodiments, as shown in FIGS. 4 and 5, the protrusion 14222 has an abutting wall **14222*a*, which is away from a lower surface of the buckle portion 1422, and each of the engaging holes 122 has a lower sloping surface 122*b*, which is configured to face the abutting wall 14222*a* after the upper cover 14 is assembled on the lower plate 12. In some embodiments, the abutting wall 14222*a* and the lower sloping surface 122*b*** are complementary to each other.

In some embodiments, as shown in FIG. 4, each of the engaging holes 122 further has an upper sloping surface **122*t*, which is located over the lower sloping surface 122*b* and is configured to guide the protrusion 14222 into the engaging hole 122. In some embodiments, an angle between the upper sloping surface 122*t* and a surface of the protrusion 14222 that is close to or even in contact with an edge of the engaging hole 122 is less than or equal to 45 degrees, or even less than or equal to 30 degrees. In other embodiments, the upper sloping surface of the engaging hole and the surface of the protrusion that is close to or even in contact with the edge of the engaging hole are complementary to each other (not shown). In some embodiments, an overlapping distance D1 between the protrusion 14222 and the edge of the corresponding engaging hole 122** is in a range of from about 0.05 mm to about 0.15 mm.

However, it should be noted that the present invention is not limited to the above-mentioned embodiments, and the shape of the engaging hole 122 of the lower plate 12 and the shape of the buckle member 142 of the upper cover 14 and the overlapping distance D1 can be adjusted appropriately according to some parameter conditions, so that the upper cover can be easily disassembled and assembled, and the entire structure is stable after the upper cover is assembled on the lower plate.

The assembly method of the upper cover 14 is described below. Please refer to FIGS. 4 and 5. First, the user places the upper cover 14 on the lower plate 12, and makes the buckle members 142 substantially align with the engaging holes 122, respectively, and then presses the upper cover 14 downwards to make the buckle members 142 enter the engaging holes 122, respectively, so that the upper cover 14 is temporarily fixed on the lower plate 12.

The disassembly method of the upper cover 14 is described below. Referring to FIGS. 5 and 4, the user can pull the upper cover 14 upwards from the side opening 144 of the upper cover 14, so that the buckle members 142 respectively leave the engaging holes 122, and the user can take off the upper cover 14.

Figure 7:
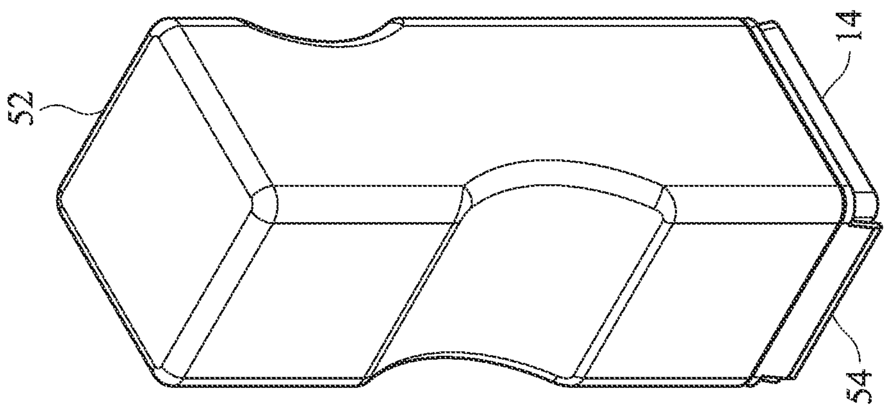
FIG. 7 is a perspective schematic diagram of the tool of FIG. 6 and the keycap of FIG. 2.
Figure 6:
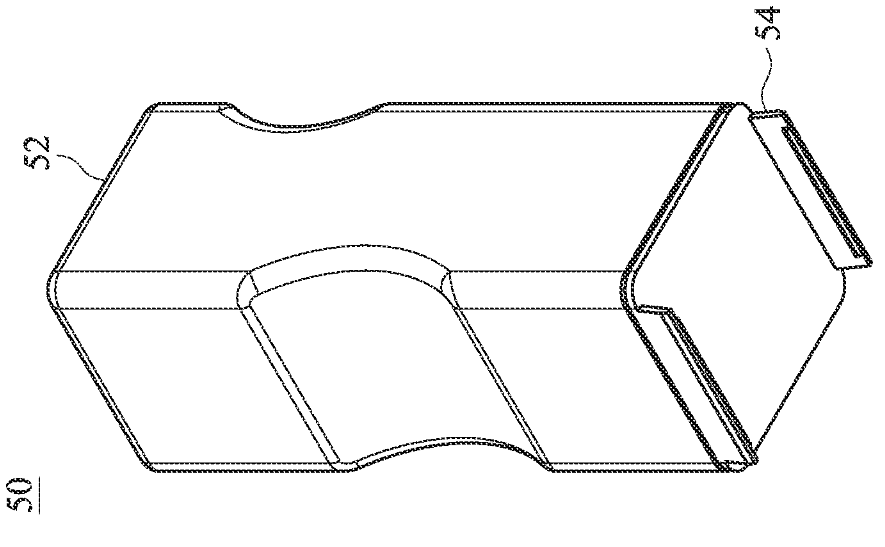
FIG. 6 is a bottom perspective schematic diagram of a tool for disassembling an upper cover of a keycap according to an embodiment of the present invention.

However, the upper cover 14 of the present invention can also be disassembled in other ways such as using a tool. FIG. 6 is a bottom perspective schematic diagram of a tool for disassembling an upper cover of a keycap according to an embodiment of the present invention. FIG. 7 is a perspective schematic diagram of the tool of FIG. 6 and the keycap of FIG. 2. As shown in FIGS. 6 and 7, the tool 50 includes a handheld portion 52 and two engaging portions 54. The two engaging portions 54 are respectively connected to two opposite sides of a bottom surface of the handheld portion 52. The two engaging portions 54 are configured to engage two opposite sides of the upper cover 14, respectively. The two engaging portions 54 are used to position the tool 50 and realize disassembly of the upper cover 14. In some embodiments, each of the engaging portions 54 has a protruding edge (not marked) disposed on its lower inner side, and the protruding edges are configured to engage lower edges of the two opposite sides of the upper cover 14, respectively.

The disassembly method of the upper cover 14 is described below. Referring to FIGS. 6 and 7, the user aligns and places the handheld portion 52 of the tool 50 on the upper cover 14 and makes the two engaging portions 54 engage the two opposite sides of the upper cover 14, respectively, and then moves the tool 50 up or lifts one side of the tool 50 to take off the upper cover 16. However, the present invention is not limited to the foregoing embodiments, and the tool 50 may further include another structure to assist in disassembling the upper cover.

However, the above are only the preferred embodiments of the present disclosure, and should not be used to limit the scope of implementation of the present disclosure, that is, simple equivalent changes and modifications made in accordance with claims and description of the present disclosure are still within the scope of the present disclosure. In addition, any embodiment of the present disclosure or claim does not need to achieve all the objectives or advantages disclosed in the present disclosure. In addition, the abstract and the title are not used to limit the scope of claims of the present disclosure.

What is claimed is:

1. A keycap, comprising:

a lower plate, having at least two engaging holes recessed inwardly from an upper surface of the lower plate and separated from each other; and an upper cover, configured to be detachably assembled on the lower plate, wherein the upper cover has at least two buckle members disposed on a bottom surface of the upper cover and respectively corresponding to the at least two engaging holes, and each of the buckle members has two buckle portions separated from each other, and each of the buckle portions having an inner arc and an outer arc has a protrusion protruding laterally outward, and each of the protrusions having an outer arc edge is configured to engage a portion of the corresponding engaging hole and has an arcuate abutting wall extending along the outer arc edge and away from a lower surface of the buckle portion, and each of the engaging holes has a lower sloping surface configured to face the arcuate abutting wall after the upper cover is assembled on the lower plate.

2. The keycap of claim 1, wherein a top-view shape of one of the at least two engaging holes is circular.

3. The keycap of claim 1, wherein a length of the outer arc of the buckle portion is greater than a length of the outer arc edge of the protrusion.

4. The keycap of claim 1, wherein the arcuate abutting wall and the lower sloping surface are complementary to each other.

5. The keycap of claim 1, wherein each of the engaging holes further has an upper sloping surface located over the lower sloping surface and configured to guide the protrusion into the engaging hole.

6. The keycap of claim 1, wherein an overlapping distance between the protrusion and an edge of the corresponding engaging hole is in a range of from about 0.05 mm to about 0.15 mm.

7. The keycap of claim 1, wherein the upper cover has a side opening.

8. The keycap of claim 1, wherein the lower plate has four connecting portions disposed on a lower surface of the lower plate, and the four connecting portions are configured to respectively connect four portions of a scissor-type connecting element.

9. The keycap of claim 1, wherein after the upper cover is assembled on the lower plate, the outer arc of each of the buckle portions is separated from the corresponding engaging hole.

* * * * *